(No Model.)
G. A. F. CLAYTON.
SAW SET.
No. 299,349. Patented May 27, 1884.
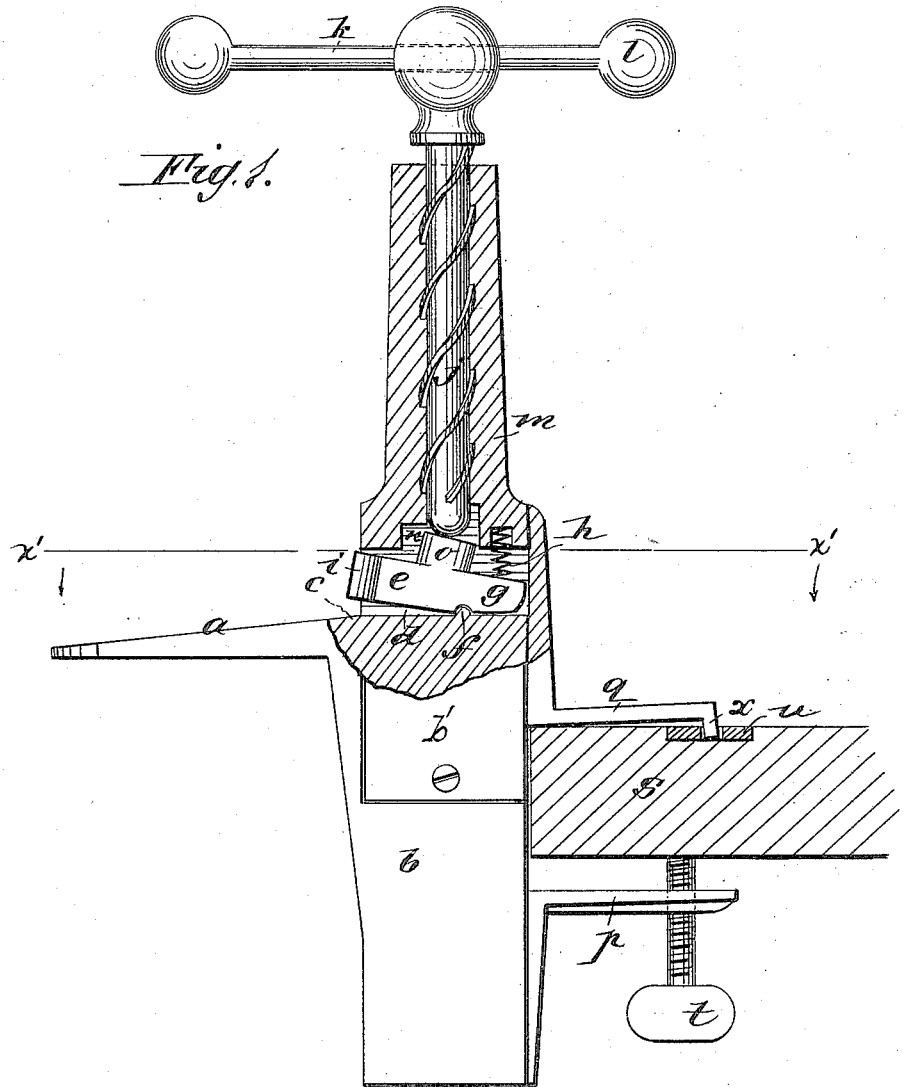
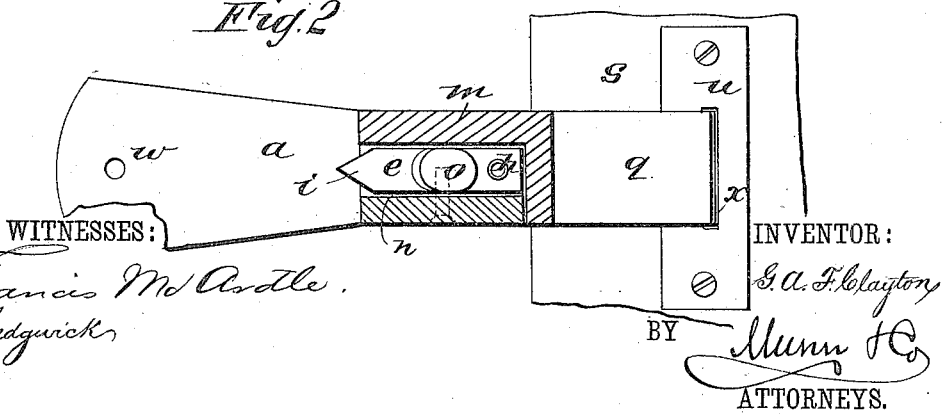
WITNESSES:
Francis McArdle
C. Sedgwick
INVENTOR:
G. A. F. Clayton
BY Munn & Co.
ATTORNEYS.

UNITED STATES PATENT OFFICE.

GEORGE ALBERT FRANCIS CLAYTON, OF MASONVILLE, VIRGINIA.

SAW-SET.

SPECIFICATION forming part of Letters Patent No. 299,349, dated May 27, 1884.

Application filed December 12, 1883. (No model.)

*To all whom it may concern:*

Be it known that I, GEORGE ALBERT FRANCIS CLAYTON, of Masonville, in the county of Accomack and State of Virginia, have invented a new and Improved Saw-Set, of which the following is a full, clear, and exact description.

My invention consists of an inclined bed-plate having an angular face, on which the teeth of the saw are to be bent, over which is a die for bending the teeth over the angle of the said plate, which die is arranged on a pivot, and has a spring to raise and hold it up for adjusting the saw under it. Over the die is a press-screw having great pitch, and provided with weighted lever-handles, by which it may be worked quickly and with great force on the die, to set the teeth accurately and effectually. The bed-plate and screw-stock are formed together with a supporting-stock having a clamp device for attaching the instrument to a bench or suitable support readily, all as hereinafter fully described.

Reference is to be had to the accompanying drawings, forming a part of this specification, in which similar letters of reference indicate corresponding parts in both the figures.

Figure 1 is partly a side elevation and partly a sectional elevation of my improved saw-set, and Fig. 2 is a horizontal section on the line $x'$ $x'$ of Fig. 1.

I cast or form a saw-holding bed-plate, $a$, with a suitable supporting-stock, $b$, arranging it on a suitable inclination to form an angle at $c$ with the floor of a mortise which receives the die, one side of which mortise is closed by a removable plate, $b'$, let into and screwed to the stock $b$, and over which angle the teeth may be bent by the setting-die. The die $e$ is pivoted on the floor of the mortise by the rib $f$ of said floor, and a corresponding groove in the lower face of the die, and said die has an extension, $g$, back of the pivot, whereon a spring, $h$, bears to raise and hold up the point $i$, by which the teeth of the saw are set. Above the die is a press-screw, $j$, having very quick or sharp pitch, to enable it to make the requisite traverse to operate the die with a partial rotation for acting thereon with a blow or very quick thrust, and said screw has a lever-handle, $k$, for working it, that is weighted with heavy balls $l$, for causing the screw to impart powerful thrusts to the die by their momentum. The screw is fitted in an extension, $m$, of the stock above the table, which extension is suitably chambered at $n$ in its base and over the table, to provide the space for the die $e$ and spring $h$. The die has a boss, $o$, on its upper side, for the end of the press-screw to take effect in forcing the die down. The die will be made of steel and hardened suitably for the purpose, and the end of the screw will probably require to be hardened also.

The stock $b$ has clamp-brackets $p$ and $q$, for attaching it to the bench $s$ by a screw, $t$, and the upper bracket, $q$, has a flange, $x$, projecting downward from the outer end to enter a slot of a plate, $u$, of metal, that may be set in the table flush with the surface, to hold the tool up snugly against the edge of the table and prevent it from working slack.

The bed-plate $a$ is to be provided with an adjusting-screw in the hole at $w$, on which the saw-plate may be raised when the teeth are not to be set to the extent of the angle at $c$.

By the arrangement of the die on the rib $f$ of the bed-plate, said rib affords a substantial fulcrum for the die to work on, and it enables the die to be quickly removed and replaced when required.

Having thus fully described my invention, I claim as new and desire to secure by Letters Patent—

1. The stock $b$, having the inclined bed-plate $a$, with its inner upper surface forming an angle, $c$, with the floor of the mortise in said stock, in combination with the pivoted die $e$, press-screw $j$, and the spring $h$, substantially as described.

2. In a saw-set, a press-screw, $j$, having a quick or sharp pitch, and the weighted lever-handle $k$ $l$, combined with a pivoted setting-die, $e$, and the stock $b$, having the inclined bed-plate $a$, with its inner upper surface forming an angle, $c$, with the floor of the mortise in said stock, substantially as and for the purpose set forth.

3. In a saw-set, a setting-die, $e$, pivoted on a rib, $f$, of the floor of the mortise in the stock, and having a press-screw, $j$, and spring $h$ for operating it, in combination with the stock $b$, having the inclined bed-plate $a$, with its inner upper surface forming an angle, c, with the floor of said mortise, substantially as and for the purpose set forth.

4. The combination, in a saw-set, with the stock b, having the inclined bed-plate a, with its inner upper surface forming an angle, c, with the floor of the mortise in said stock, and also having chambered extension-stock m, of the setting-die e, spring h, press-screw j, and weighted lever-handle k l, said stock having the attaching-clamp p q and screw t, substantially as and for the purpose set forth.

GEORGE ALBERT FRANCIS CLAYTON.

Witnesses:
M. OLDHAM, Jr.,
M. H. HIGGINS.